(12) United States Patent
Buron

(10) Patent No.: US 9,505,415 B1
(45) Date of Patent: Nov. 29, 2016

(54) UNIVERSAL CONTINUOUS BELAY SYSTEM

(71) Applicant: American Adventure Park Systems, Whitesburg, GA (US)

(72) Inventor: Yvan Buron, Gellos (FR)

(73) Assignee: AMERICAN ADVENTURE PARK SYSTEMS, Whitesburg, GA (US)

( * ) Notice: Subject to any disclaimer, the term of this patent is extended or adjusted under 35 U.S.C. 154(b) by 0 days.

(21) Appl. No.: 15/003,663

(22) Filed: Jan. 21, 2016

Related U.S. Application Data

(60) Provisional application No. 62/200,811, filed on Aug. 4, 2015.

(51) Int. Cl.
*B61B 12/00* (2006.01)
*B61B 12/12* (2006.01)
*B61B 7/00* (2006.01)

(52) U.S. Cl.
CPC .............. *B61B 12/122* (2013.01); *B61B 7/00* (2013.01)

(58) Field of Classification Search
CPC ........ B61B 12/122; B61B 7/00; B65H 59/16
USPC ................ 104/112, 115; 24/598.1-9; 182/36
See application file for complete search history.

(56) References Cited

U.S. PATENT DOCUMENTS

| | | | | |
|---|---|---|---|---|
| 1,241,806 A * | 10/1917 | Anderson | ............... | F16B 45/06 24/598.5 |
| 4,279,062 A * | 7/1981 | Boissonnet | ............... | B66C 1/36 24/305 |
| 4,811,467 A * | 3/1989 | Lowe | ..................... | F16B 45/02 24/592.1 |
| 4,835,823 A * | 6/1989 | Contat | ..................... | F16B 45/02 24/582.11 |
| 6,227,015 B1 * | 5/2001 | Luquire | ................ | E05B 37/025 24/598.1 |
| 6,520,290 B1 * | 2/2003 | Carter | ................ | A62B 35/0037 182/3 |
| 6,681,891 B2 * | 1/2004 | Richard | .................... | A62B 1/14 182/192 |
| 7,137,481 B2 * | 11/2006 | Petzl | ........................ | A62B 1/14 182/191 |
| 7,228,601 B2 * | 6/2007 | Thompson | .............. | F16B 45/02 24/598.2 |
| 7,249,475 B2 * | 7/2007 | Yu | .......................... | E05B 37/025 24/598.1 |
| 8,226,138 B2 * | 7/2012 | Rocourt | ............. | A62B 35/0081 294/82.34 |
| 9,320,924 B2 * | 4/2016 | Patel | ................... | A62B 35/0037 |
| 2005/0241596 A1 * | 11/2005 | Deverall | .............. | A01K 27/005 119/792 |
| 2006/0027134 A1 * | 2/2006 | Steele | ....................... | B61B 7/00 104/113 |
| 2012/0048138 A1 * | 3/2012 | Gustafson | .............. | A63G 21/22 104/53 |
| 2014/0261053 A1 * | 9/2014 | Deel | ......................... | B61B 7/00 104/112 |
| 2015/0090148 A1 * | 4/2015 | Weston | .................. | A63G 21/20 104/91 |

\* cited by examiner

Primary Examiner — Jason C Smith

(57) ABSTRACT

A fall protection system that is easy to assemble, up to international safety standards, and allows fluid progression. The system includes an at least engagement hook, an at least one bifurcating plate, an at least one cable tensioning anchor, and an at least one T-shaped anchor plate. The engagement hook includes a C-shaped body, a first stud, and a second stud. The first stud and the second stud are integrated through the C-shaped body, on either side of an interlocking gap of the C-shaped body. The user is attached to the engagement hook by a tether attachment hole of the C-shaped body. The bifurcating plate includes a cross-shaped body and a plurality of third studs. Each of the third studs is integrated through a corresponding leg of the cross-shaped body. The bifurcating plate, the cable tensioning anchor, and the T-shaped anchor plate are tethered by a system of cables.

20 Claims, 12 Drawing Sheets

UNIVERSAL CONTINUOUS BELAY SYSTEM

The current application claims a priority to the U.S. Provisional Patent application Ser. No. 62/200,811 filed on Aug. 4, 2015.

FIELD OF THE INVENTION

The present invention relates generally to personal fall protection systems. More specifically, the present invention is a universal continuous belay system that is easy to assemble, highly customizable, and includes a variety of safety features. The present invention can be used in various configurations for varying applications including, but not limited to, ascending, descending, trail bifurcation, evacuation points, Tarzan swings, and overtaking.

BACKGROUND OF THE INVENTION

Belaying refers to a variety of techniques used by climbers to exert tension on a climbing rope so that a falling climber does not fall too far, preventing injuries. Belay systems may refer to a system of cables held in tension at great heights to provide safety for individuals that may fall. Further, continuous belay systems eliminate the need for any transfer between lines besides at the start of a course or at the end/exit, eliminating the possibility that a participant can become disconnected from the safety belay system during his or her time on the associated course. There are a number of continuous belay systems that exist today, but each one has its own disadvantages and downfalls. One of the main disadvantages of modern continuous belay systems is that they are very complicated and comprise many moving parts that are susceptible to breakage, therefore requiring frequent inspection. The present invention provides a system that comprises very few moving parts to eliminate any points of weakness in the system as well as to prevent accidental unlocking. Additionally, the present invention is easy to use and can easily be retrofitted for various applications. This in turn requires less staffing for operations. The present invention utilizes a single continuous cable or a swaged multitude of cable to provide the system with a single cable web system without any breaks.

Furthermore, many of the existing systems do not provide a smooth transition from one point to another. All components in the present invention are arranged in a way to provide smooth transitions, eliminating shape edges that an individual may get caught up on. The passage of the engagement hook through the various components of the present invention is smooth and easy. The present invention introduces safety features to quickly inspect the wear on the components that are used frequently and are most important to the safety of the participants, such as the engagement hook. A quick inspection will determine if the component is out of service and must be replaced immediately. As a result, there is no need for extensive inspections, thus saving time, energy, and money for the establishment. The present invention brings forth various advantages and features that the existing systems fall short on.

DETAIL DESCRIPTIONS OF THE INVENTION

All illustrations of the drawings are for the purpose of describing selected versions of the present invention and are not intended to limit the scope of the present invention.

The present invention generally relates to personal fall protection systems. More specifically, the present invention is a continuous belay system which protects a user(s) against falling from elevated environments/positions while simultaneously providing the user(s) with the option to translate along and transition within the belay system with increased mobility and convenience. One of the main purposes for the present invention is aerial adventure parks that may include zip lines, elevated obstacle courses, and other extreme adventure structures. Although, the present invention may be adapted and configured for various alternative purposes including, but not limited to, safety system for construction sites, rock climbing expeditions, aerial performances, industry and building/construction fall security, and other similar applications.

Figure 1:
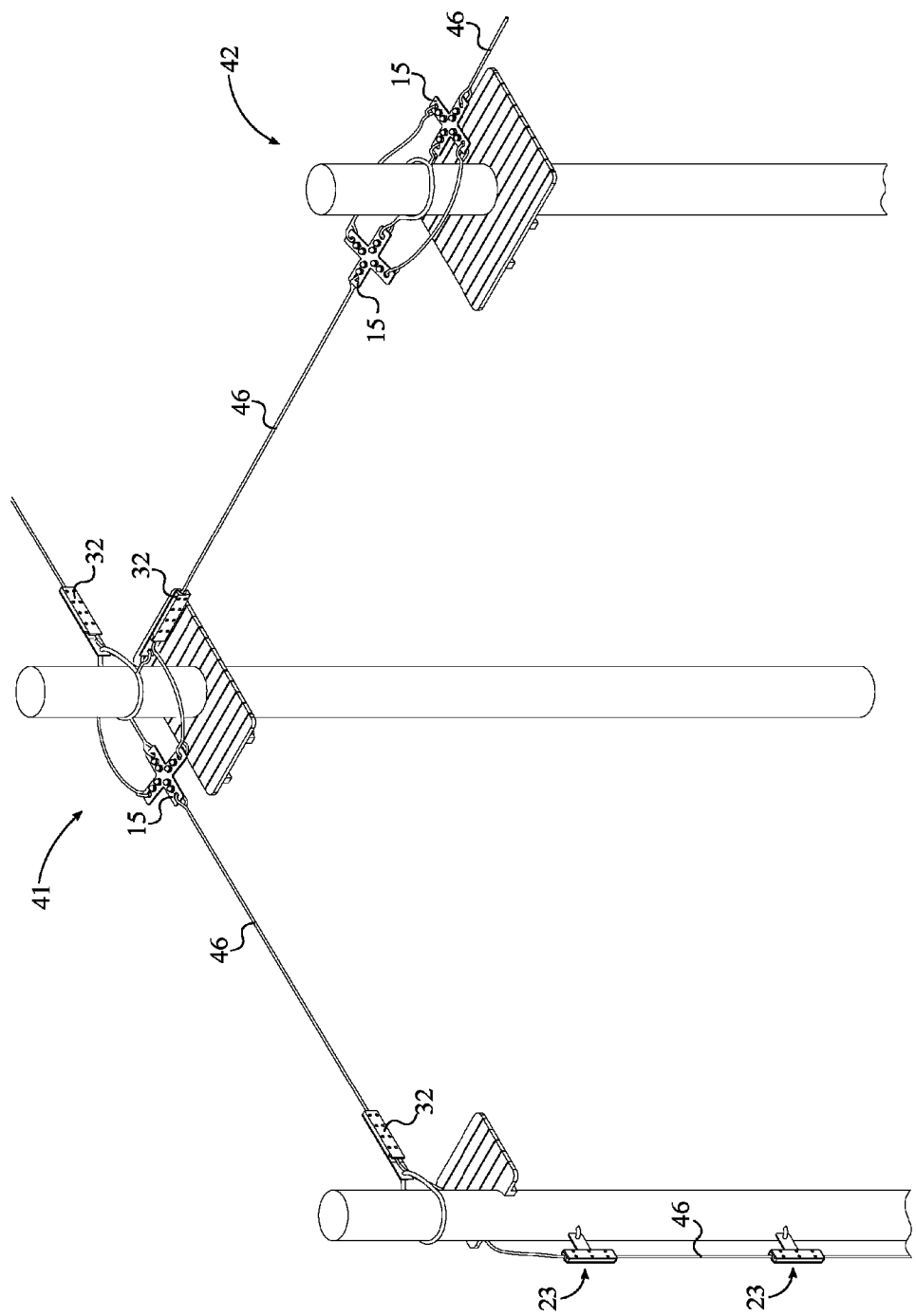
FIG. 1 is a perspective view of the present invention.
Figure 2:
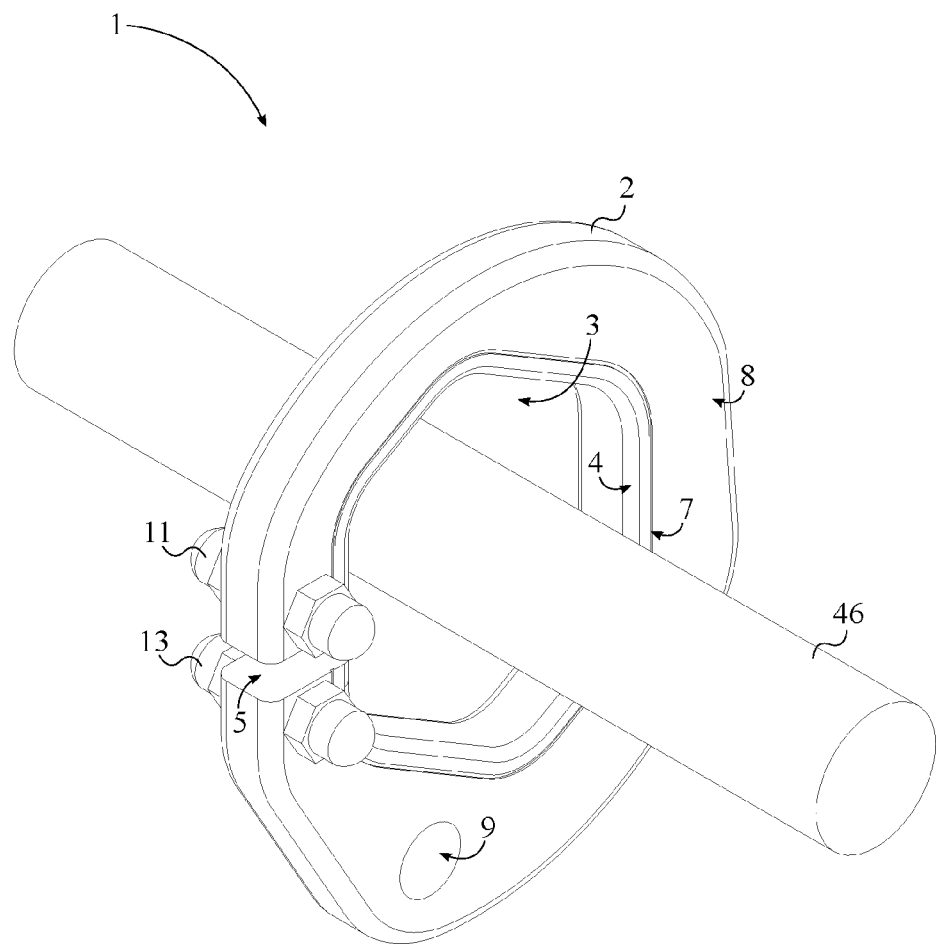
FIG. 2 is a perspective view of an engagement hook of the present invention.
Figure 3:
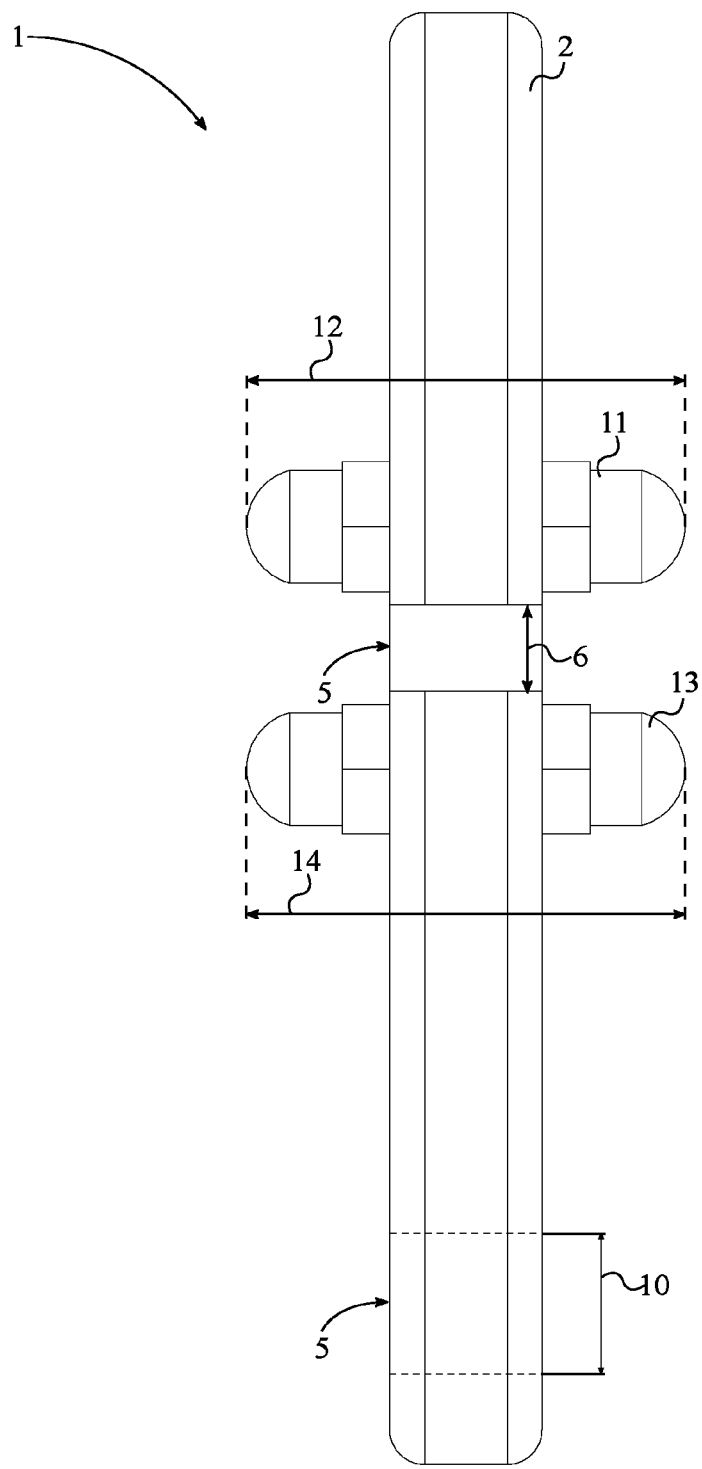
FIG. 3 is an enlarged front view of the engagement hook.
Figure 4:
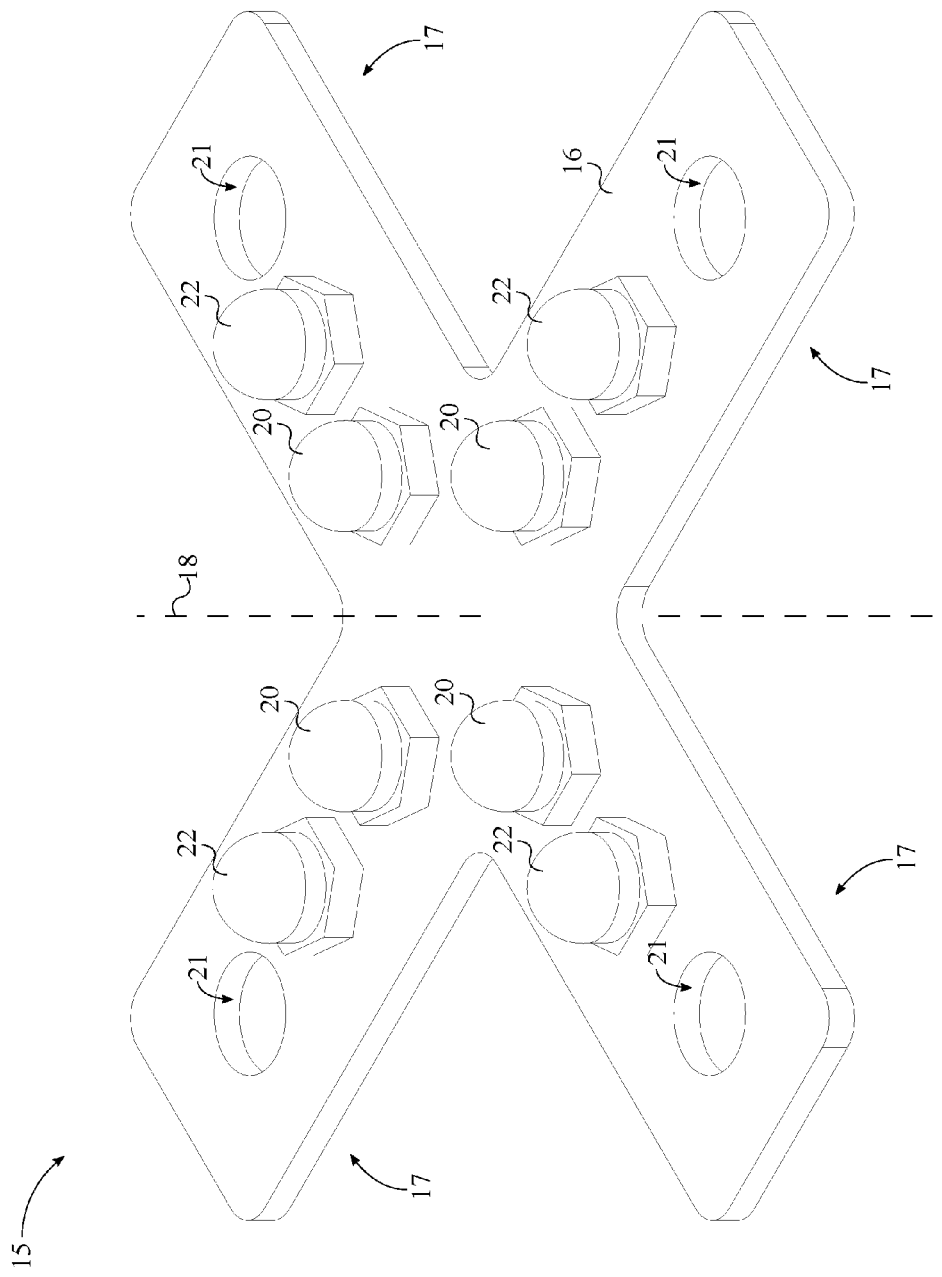
FIG. 4 is a perspective view of a bifurcating plate of the present invention.
Figure 5:
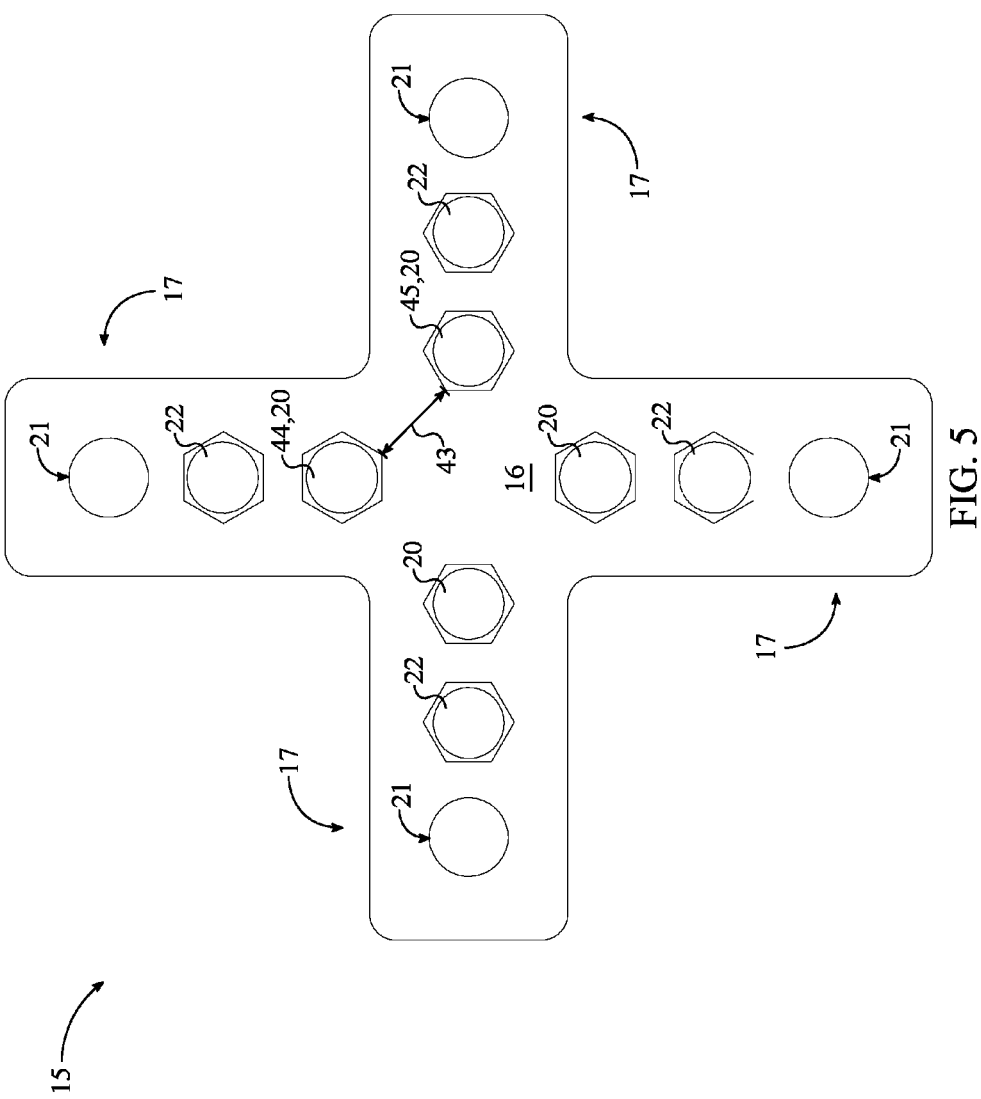
FIG. 5 is a top view of the bifurcating plate.
Figure 6:
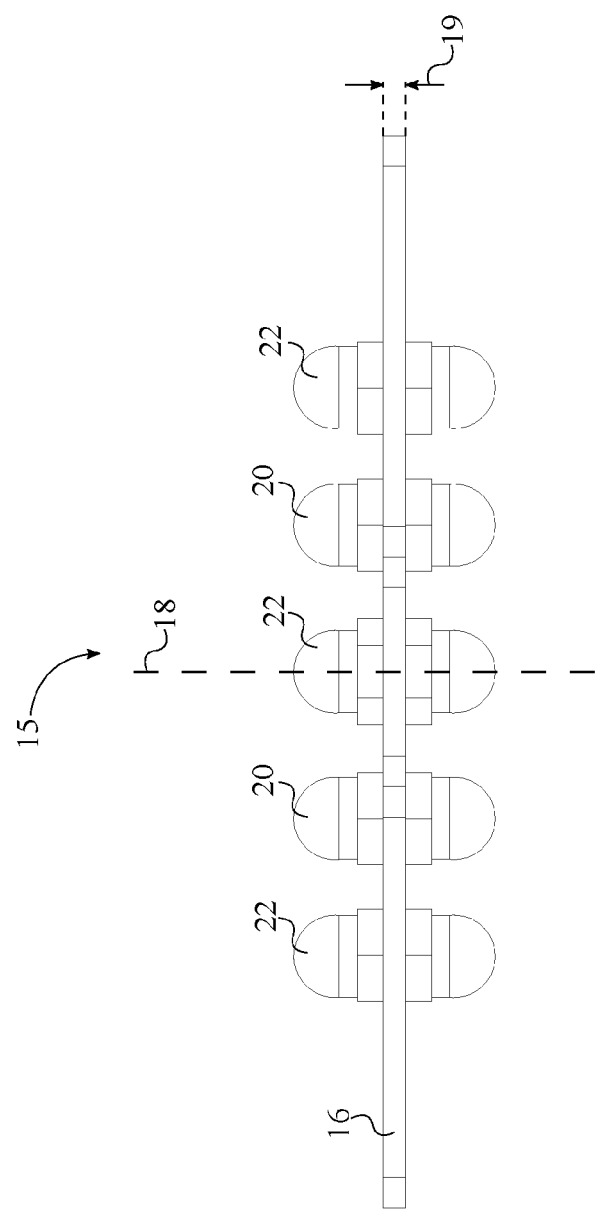
FIG. 6 is a side-view of the bifurcating plate.

Referring to FIG. 1 and FIG. 2, the present invention comprises an at least one engagement hook 1, an at least one bifurcating plate 15, an at least one T-shaped anchor plate 23, an at least one cable tensioning anchor 32, and a system of cables 46. The engagement hook 1 mechanically couples the user to the present invention. This is most often times achieved through a safety harness and a tether, although alternative means may also be utilized. The tether is attached to the engagement hook 1 on one end and the safety harness on the other, either through a carabiner or a direct link. The engagement hook 1 comprises a C-shaped body 2, a tether attachment hole 9, a first stud 11, and a second stud 13. The C-shaped body 2 is designed to engage and attach to the system of cables 46 as wells as the various components of the present invention. The C-shaped body 2 comprises a central hole 3 through which a cable from the system of cables 46 may traverse through, thus slidably engaging the engagement hook 1 to the system of cables 46 as seen in FIG. 2 and allows the user to move freely through the course/path set up by the system of cables 46. The central hole 3 is preferably hex shaped as seen in FIG. 2 with rounded edges. The corners of the hex shape act as guides for the engagement hook 1 and allows the engagement hook 1 to fit over the bifurcating plate 15, the T-shaped anchor 23, and the cable tensioning anchor 32 in a secure manner with no chance of slipping off. The C-shaped body 2 also includes an interlocking gap 5. The interlocking gap 5 allows the engagement hook 1 to pass through the bifurcating plate 15, the cable tensioning anchor 32, and the T-shaped anchor plate 23 while being mechanically coupled to the system of cables 46 in case the user falls. The tether attachment hole 9 traverses through the C-shaped body 2 and oriented parallel to the central hole 3 of the C-shaped body 2. The tether attachment hole 9 is the means by which the user connects his or her safety harness and tether to the engagement hook 1, either directly or through intermediate devices such as a carabiner. The tether attachment hole 9 is preferably circular shaped to ensure pressure is evenly distributed, thus extending the lifetime of the engagement hook 1. The first stud 11 and the second stud 13 are used to prevent the engagement hook 1 from disconnecting from bifurcating plate 15. The first stud 11 and the second stud 13 are integrated through the C-shaped body 2 and positioned parallel to the central hole 3. More specifically, the first stud 11 is positioned adjacent to the interlocking gap 5. The second stud 13 is positioned adjacent to the interlocking gap 5, opposite the first stud 11 as seen in FIG. 2. It is preferred that a length 12 of the first stud 11 is equal to a length 14 of the second stud 13 as seen in FIG. 3. Referring to FIG. 4 and FIG. 5, the bifurcating plate 15 comprises a cross-shaped body 16, a plurality of third studs 20, a plurality of cable attachment holes 21, and a plurality of barricades 22. The bifurcating plate 15 allows for left and right passages 42 on platforms, path bifurcations 41, and hook evacuations. Left and right passages 42 allows for multiple users attached to the system of cables 46 to pass each other when on the same path. Path bifurcation 41 allows for a single path of the belay system to be split into multiple paths. Hook evacuations is an emergency path attached to a platform or a supporting structure which allows users to disconnect from the present invention in the case of an emergency. The bifurcating plate 15 can be configured to join up to four cables from the system of cables 46 and allow the user access to each one. This is achieved through the cross-shaped body 16 as it allows for four connection points. To allow the engagement hook 1 to freely move through the bifurcating plate 15 as a width 6 of the interlocking gap 5 is greater than a thickness 19 of the cross-shaped body 16. Complimentary, the plurality of third studs 20 provides travel paths for the engagement hook 1 and prevents the engagement hook 1 from de-coupling from the bifurcating plate 15 while the user translates the engagement hook 1 from one cable to another through the bifurcating plate 15. Each of the plurality of third studs 20 is integrated through a corresponding leg 17 of the cross-shaped body 16 as seen in FIG. 5 and FIG. 6. Additionally, each of the plurality of third studs 20 is integrated into the cross-shaped body 16 with an equal portion protruding from either side of the cross-shaped body 16, resulting in a symmetrical design. The symmetrical design allows the engagement hook 1 to be turned upside down and still pass through the bifurcating plate 15 without any chance of de-coupling. It is preferred that the length 12 of the first stud 11 is greater than an interlocking distance 43 between an arbitrary stud 44 and an adjacent stud 45, wherein the arbitrary stud 44 and the adjacent stud 45 is from the plurality of third studs 20 as seen in FIG. 5. This condition ensures that the first stud 11 and the second stud 13 cannot laterally pass in between the arbitrary stud 44 and the adjacent stud 45, causing the engagement hook 1 to de-couple from the bifurcating plate 15. In order to pass the bifurcating plate 15, the user simply positions the interlocking gap 5 coincident with the cross-shaped body 16 and slides the engagement hook 1 from one corresponding leg 17 to another corresponding leg 17.

Left and right passages 42 is achieved by anchoring two bifurcating plates 15 on either side of a supporting structure with two additional cables connecting the two bifurcating plates 15. Additionally, each of the bifurcating plates 15 is attached to their respective cable paths that are connected to another supporting structure as seen in FIG. 1. A support structure may be a pole, tree, wall, or other similar anchor. This allows two or more users to pass each other when traveling in the same or opposite direction along the path. Path bifurcations 41 and hook evacuations are achieved through the use of a single bifurcating plate 15, wherein three of the corresponding legs 17 of the cross-shaped body 16 are connected to three different cables from the system of cables 46 and the fourth corresponding leg 17 is anchored to the supporting structure. Alternative configurations and uses for the bifurcating plate 15 may also be utilized.

Figure 7:
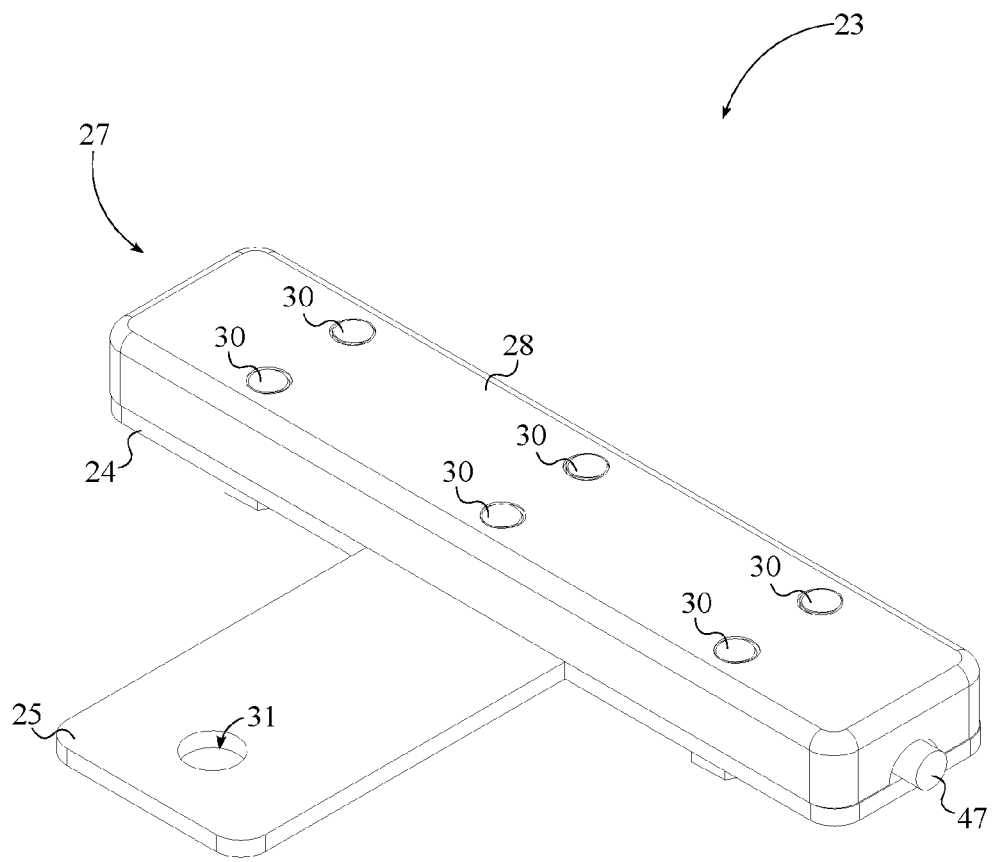
FIG. 7 is a perspective view of a T-shaped anchor plate of the present invention.
Figure 8:
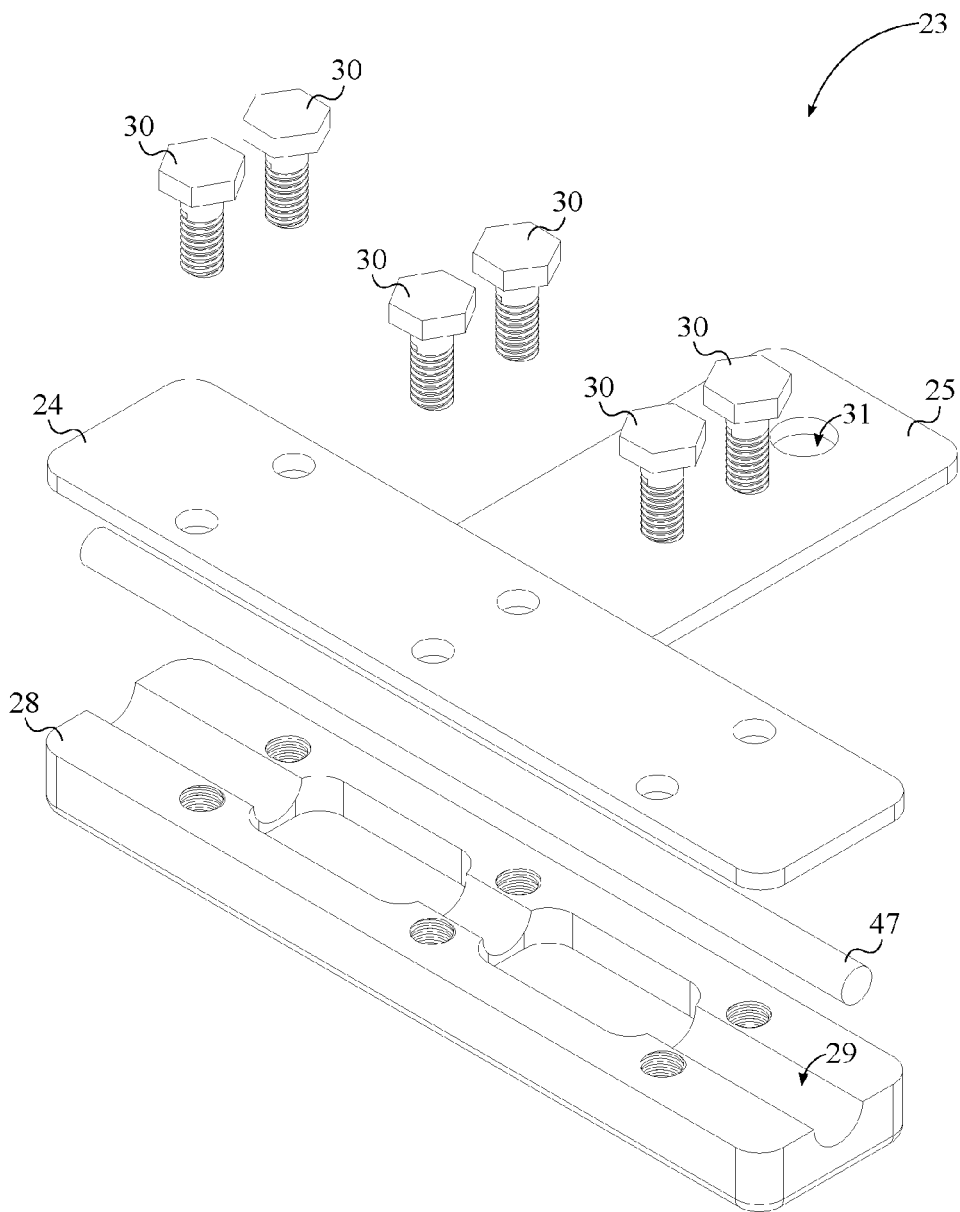
FIG. 8 is an exploded perspective view of the T-shaped anchor plate.
Figure 9:
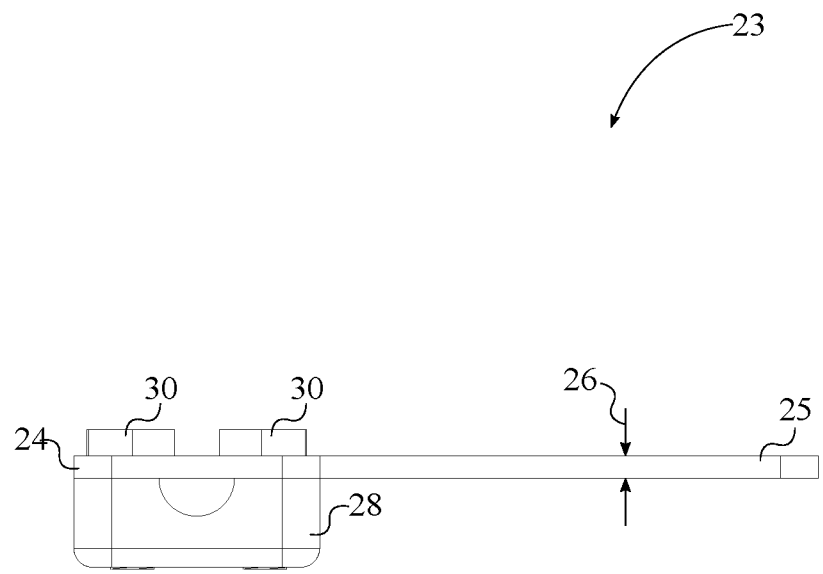
FIG. 9 is a side-view of the T-shaped anchor plate.

Referring to FIG. 1 and FIG. 4, the plurality of cable attachment holes 21 provides a means for connecting cables from the system of cables 46 to the bifurcating plate 15. Each of the plurality of cable attachment holes 21 is peripherally positioned on the corresponding leg 17 of the cross-shaped body 16. Additionally, each of the plurality of cable attachment holes 21 traverses through the cross-shaped body 16 and oriented parallel to the central axis 18 of the cross-shaped body 16 as seen in FIG. 4. The plurality of barricades 22 is used to prevent the engagement hook 1 from de-coupling from the bifurcating plate 15 when sliding the engagement hook 1 along the corresponding leg 17 of the cross-shaped body 16. More specifically, the plurality of barricades 22 is radially positioned about the central axis 18 in between the plurality of cable attachment holes 21 and the plurality of third studs 20. Referring to FIG. 6, each of the plurality of barricades 22 is integrated through the cross-shaped body 16, similar to the plurality of third studs 20. The number within the plurality of barricades 22 and their respective designs is subject to change in order to accommodate various alternative configurations. Referring to FIG. 1 and FIG. 8, the T-shaped anchor plate 23 is used to secure a cable from the system of cables 46 along a vertical structure in order to enable vertical ascent and descent for the user. The T-shaped anchor plate 23 can also be used in via ferrate at intermediate points, essentially using the T-shaped anchor plate 23 to support a cable from the system of cables 46 in a horizontal orientation. The T-shaped anchor plate 23 comprises a first arm 24, a second arm 25, a first cable securement mechanism 27, and a first anchor hole 31 as seen in FIG. 7. The first arm 24 is oriented perpendicular and is adjacently connected to the second arm 25 to create a T-shape. The first arm 24 in conjunction with the first cable securement mechanism 27 attach a first selected cable 47 from the system of cables 46 to the T-shaped anchor plate 23. More specifically, the first selected cable 47 is adjacently positioned along the first arm 24 and is attached by the first cable securement mechanism 27. Referring to FIG. 9, in order to allow the engagement hook 1 to pass the T-shaped anchor plate 23, a thickness 26 of the second arm 25 is designed to be less than the width 6 of the interlocking gap 5. While the second arm 25 allows the engagement hook 1 to traverse through the T-shaped anchor plate 23, the first arm 24 in conjunction with the first selected cable 47 and the first cable securement mechanism 27 create a obstruction which ensures the engagement hook 1 stays mechanically coupled to the T-shaped anchor plate 23 and the system of cables 46 the whole time. In order to pass the T-shaped anchor plate 23, the user simply positions the interlocking gap 5 coincident with the second arm 25 and slides the engagement hook 1 until it clears the second arm 25.

Referring to FIG. 7 and FIG. 8, the preferred first cable securement mechanism 27 comprises a first elongated anchorage block 28, a first cable-receiving channel 29, and a plurality of first fasteners 30. The first elongated anchorage block 28 is a rectangular extrusion that is sized to compliment the first arm 24. The first cable-receiving channel 29 laterally traverses into the first elongated anchorage block 28 and spans the length of the first elongated anchorage block 28. Additionally, the first cable-receiving channel 29 is semi-circularly shaped and is sized to receive the first selected cable 47. In order to securely attach the first selected cable 47 to the T-shaped anchor plate 23, the first elongated anchorage block 28 is positioned adjacent to the first selected cable 47, opposite the first arm 24, with the first selected cable 47 being positioned within the first cable-receiving channel 29. The plurality of first fasteners 30 is distributed along the first arm 24 and secures the first elongated anchorage block 28 to the first arm 24, thus engaging and trapping the first selected cable 47 within as well, seen in FIG. 7. The plurality of first fasteners 30 is torqued to a specific setting according to international safety standards. Type of devices that may be used for the plurality of first fasteners 30 include, but are not limited to, bolts, screws, bolt-nut fasteners, and rivets. The T-shaped anchor plate 23 is attached to a supporting structure, a pole or a tree for example, through the first anchor hole 31. The first anchor hole 31 traverses through the second arm 25. A screw, bolt, tether, and cord may be used with the first anchor hole 31 in order to attach the T-shaped anchor plate 23 to the supporting structure, although alternative mechanisms and devices may also be used. The first cable-receiving channel 29 may also further comprise a plurality of first sectional indents. The first sectional indents are essentially wider and deeper indentations of rectangular shape that enable the first elongated anchorage block 28 to act as a swage sleeve when installed, providing a more secure grip of the first selected cable 47. The first sectional indents are equally distributed along the length of the first elongated anchorage block 28.

In an alternative embodiment of the present invention, a plurality of cable locks is used as the first cable securement mechanism 27 in order to safely secure the first selected cable 47 to the T-shaped anchor plate 23. In this embodiment, the plurality of cable locks is distributed along the first arm 24 with each of the cable locks comprising a pair of bolt-nut fasteners and a cable clamp. The cable clamp is positioned adjacent to the first selected cable 47, opposite the first arm 24, while the pair of bolt-nut fasteners traversing through the cable clamp and the first arm 24. The pair of bolt-nut fasteners is tightened to a specific torque setting, set by international safety standards.

Figure 10:
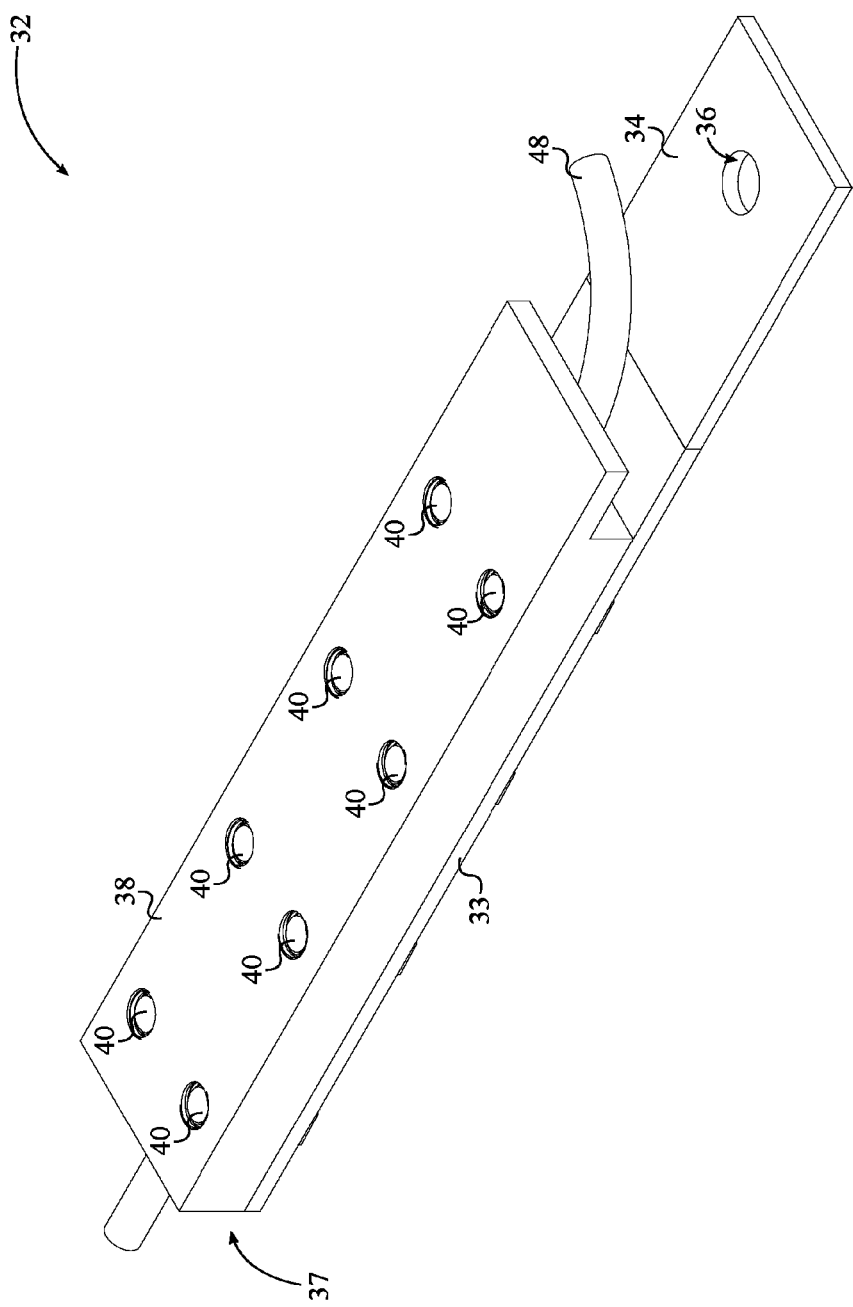
FIG. 10 is perspective view of a cable tensioning anchor of the present invention.
Figure 11:
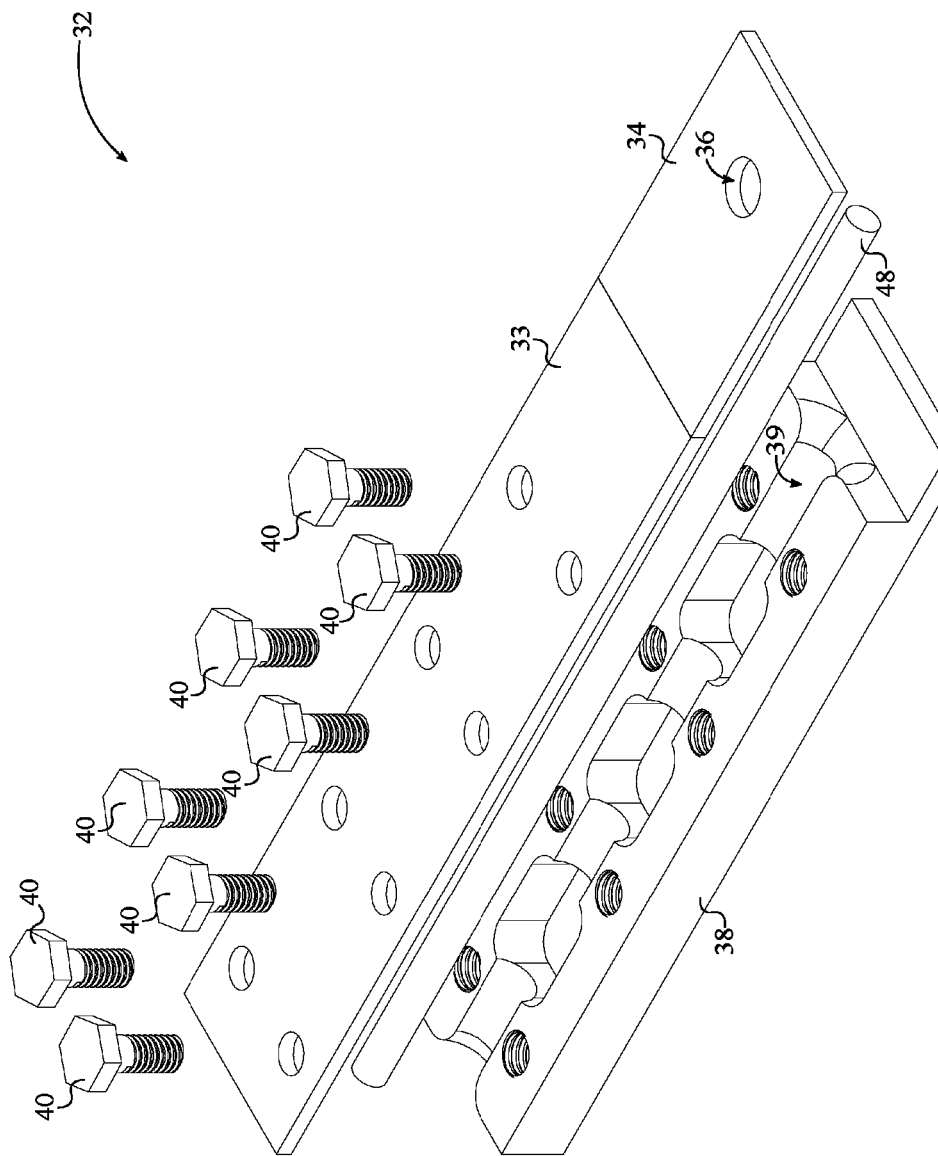
FIG. 11 is an exploded perspective view of the cable tensioning anchor.
Figure 12:
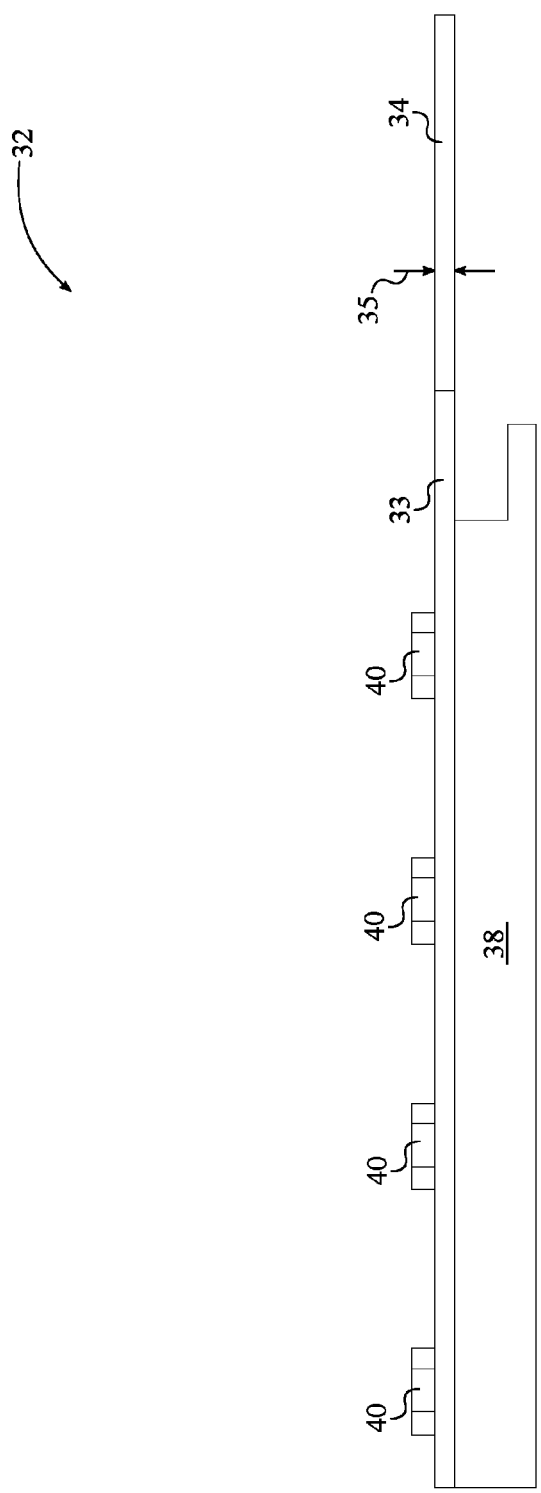
FIG. 12 is a side-view of the cable tensioning anchor.

The cable tensioning anchor 32 secures a second selected cable 48 from the system of cables 46 to a support structure and keeps said cable under tension, thus serving to catch and support any user that may fall while traversing through the associated path. Referring to FIG. 10 and FIG. 11, the cable tensioning anchor 32 comprises a cable engagement portion 33, a transition no-load portion 34, a second anchor hole 36, and a second cable securement mechanism 37. The second selected cable 48 is attached to a first end of the cable tensioning anchor 32. More specifically, the second selected cable 48 is attached to the cable engagement portion 33 by the second cable securement mechanism 37. The cable engagement portion 33 is adjacently connected to the transition no-load portion 34, resulting in an elongated plate design/structure as seen in FIG. 11. The transition no-load portion 34 allows the engagement hook 1 to pass the cable tensioning anchor 32 without de-coupling from the second selected cable 48. Referring to FIG. 12, this is achieved by setting a thickness 35 of the transition no-load portion 34 to be less than the width 6 of the interlocking gap 5. A second end of the cable tensioning anchor 32 is attached to the support structure by the second anchor hole 36 and a supporting cable/tether. More specifically, the second anchor hole 36 traverses through the transition no-load portion 34, offset from the cable engagement portion 33. In order to pass the cable tensioning anchor 32, the user simple aligns the interlocking gap 5 with the transition no-load portion 34 and slides the engagement hook 1 laterally to bypass the cable tensioning anchor 32.

Similar to the first cable securement mechanism 27, referring to FIG. 10 and FIG. 11, the preferred second cable securement mechanism 37 comprises a second elongated anchorage block 38, a second cable-receiving channel 39, and a plurality of second fasteners 40. The second elongated anchorage block 38 is a rectangular extrusion that is sized to compliment the cable engagement portion 33 as seen in FIG. 10 and FIG. 11. The second cable-receiving channel 39 laterally traverses into the second elongated anchorage block 38 and spans the length of the second elongated anchorage block 38. Additionally, the second cable-receiving channel 39 is semi-circularly shaped and is sized to receive the second selected cable 48. In order to securely attach the second selected cable 48 to the cable engagement portion 33, the second elongated anchorage block 38 is positioned adjacent to the second selected cable 48, opposite the cable engagement portion 33, with the second selected cable 48 being positioned within the second cable-receiving channel 39. The plurality of second fasteners 40 is distributed along the cable engagement portion 33 and secure the second elongated anchorage block 38 to the cable engagement portion 33, thus engaging and trapping the second selected cable 48 within as well, seen in FIG. 10. The plurality of second fasteners 40 is torqued to a specific setting according to international safety standards. Type of devices that may be used for the plurality of second fasteners 40 include, but are not limited to, bolts, screws, bolt-nut fasteners, and rivets. The second cable-receiving channel 39 may also further comprise a plurality of second sectional indents. The second sectional indents are essentially wider and deeper indentations of rectangular shape that enable the second elongated anchorage block 38 to act as a swage sleeve when installed, providing a more secure grip of the second selected cable 48. The second sectional indents are equally distributed along the length of the second elongated anchorage block 38.

In an alternative embodiment of the present invention, a plurality of cable locks is used as the second cable securement mechanism 37 in order to safely secure the second selected cable 48 to the cable tensioning anchor 32. In this embodiment, the plurality of cable locks is distributed along the cable engagement portion 33 with each of the cable locks comprising a pair of bolt-nut fasteners and a cable clamp. The cable clamp is positioned adjacent to the second selected cable 48, opposite the cable engagement portion 33, while the pair of bolt-nut fasteners traversing through the cable clamp and the cable engagement portion 33. The pair of bolt-nut fasteners are tightened to a specific torque setting, set by international safety standards.

For fall protection systems, it is important that each component meets the international safety standards at all times. Traditionally, this is achieved by long, extensive, and frequent safety inspections. Alternatively, the present invention utilizes a multitude of integrated features which allow for quick and easy safety inspections. One of these features is a safety line 7 for the engagement hook 1. The safety line 7 is used to detect wear and tear of the C-shaped body 2, in particular the area directly around the central hole 3. The safety line 7 is positioned around a rim 4 of the central hole 3 as seen in FIG. 2. Additionally, the safety line 7 is radially positioned from the rim 4 by an offset distance. The offset distance is determined by the safety factor required by international safety standards. When an inner surface of the central hole 3 deforms such that it reaches the safety line 7, the engagement hook 1 is then identified as a faulty component that is need of immediate replacement. The safety line 7 may be painted or drawn onto the C-shaped body 2. It is preferred that the safety line 7 traverses into a first surface 8 of the C-shaped body 2 as seen in FIG. 2, this prevents the safety line 7 from being erased or distorted due to wear and tear associated with exposure to various weather conditions such as rain, snow, sunlight, and sleet.

Another safety feature that the present invention utilizes is a safety pin. The safety pin is used to determine the structural integrity of the area directly around the tether attachment hole 9 because this point bears the whole weight of the user and is susceptible to damage. A diameter of the safety pin is set to be greater than a diameter 10 of the tether attachment hole 9 by a specific factor, defined by international safety standards. As the engagement hook 1 is used over time, the tether attachment hole 9 may experience extensive wear and tear, resulting in marginal deformation. When any portion of the safety pin can be inserted into the tether attachment hole 9, the engagement hook 1 is deemed out of service and should be immediately replaced.

The various components of the present invention are connected together by the system of cables 46 to create highly mobile and safe fall protection system. More specifically, the at least one bifurcating plate 15, the at least one cable tensioning anchor 32, the at least one T-shaped anchor plate 23 are all tethered amongst the system of cables 46 with the at least one engagement hook 1 being slidably engaged to the system of cables 46. The use of a plurality of each of the constituents of the present invention allows for a large variety of configurations.

Although the invention has been explained in relation to its preferred embodiment, it is to be understood that many other possible modifications and variations can be made without departing from the spirit and scope of the invention as hereinafter claimed.

What is claimed is:

1. A universal continuous belay system comprises:
an at least one engagement hook;
an at least one bifurcating plate;
an at least one cable tensioning anchor;
a system of cables;
the engagement hook comprises a C-shaped body, a tether attachment hole, a first stud, and a second stud;
the tether attachment hole traversing through the C-shaped body, parallel to a central hole of the C-shaped body;
the first stud and the second stud being integrated through the C-shaped body, parallel to the central hole;
the first stud being positioned adjacent to an interlocking gap of the C-shaped body;
the second stud being positioned adjacent to the interlocking gap, opposite the first stud;
the bifurcating plate comprises a cross-shaped body and a plurality of third studs;
each of the plurality of third studs being integrated through a corresponding leg of the cross-shaped body;
the cable tensioning anchor and the bifurcating plate being tethered amongst the system of cables; and
the engagement hook being slidably engaged to the system of cables.

2. The universal continuous belay system as claimed in claim 1 comprises:
the engagement hook further comprises a safety line;
the safety line being positioned around a rim of the central hole;
the safety line being radially positioned from the rim; and
the safety line traversing into a first surface of the C-shaped body.

3. The universal continuous belay system as claimed in claim 1 comprises:
a first selected cable from the system of cables;
an at least one T-shaped anchor plate;
the T-shaped anchor plate comprises a first arm, a second arm, a first cable securement mechanism, and a first anchor hole;
the first arm being oriented perpendicular to the second arm;
the first arm being adjacently connected to the second arm;
the first anchor hole traversing through the second arm;
the first selected cable being adjacently positioned along the first arm; and
the first selected cable being attached to the first arm by the first cable securement mechanism.

4. The universal continuous belay system as claimed in claim 3, wherein a width of the interlocking gap is greater than a thickness of the second arm.

5. The universal continuous belay system as claimed in claim 3 comprises:
the first cable securement mechanism comprises a first elongated anchorage block, a first cable-receiving channel, and a plurality of first fasteners;
the first cable-receiving channel laterally traverses into the first elongated anchorage block;
the first elongated anchorage block being positioned adjacent to the first selected cable, opposite the first arm;
the first selected cable being positioned within the first cable-receiving channel;
the plurality of first fasteners being distributed along the first arm; and
the first elongated anchorage block being attached to the first arm by the plurality of first fasteners.

6. The universal continuous belay system as claimed in claim 1 comprises:
a second selected cable from the system of cables;
the cable tensioning anchor comprises a cable engagement portion, a transition no-load portion, a second anchor hole, and a second cable securement mechanism;
the cable engagement portion being adjacently connected to the transition no-load portion;
the second anchor hole traversing through the transition no-load portion, offset from the cable engagement portion; and
the second selected cable being attached to the cable engagement portion by the second cable securement mechanism.

7. The universal continuous belay system as claimed in claim 6 comprises:
the second cable securement mechanism comprises a second elongated anchorage block, a second cable-receiving channel, and a plurality of second fasteners;
the second cable-receiving channel laterally traverses into the second elongated anchorage block;
the second elongated anchorage block being positioned adjacent to the second selected cable, opposite the cable engagement portion;
the second selected cable being positioned within the second cable-receiving channel;

the plurality of second fasteners being distributed along the cable engagement portion; and the second elongated anchorage block being attached to the cable engagement portion by the plurality of second fasteners.

8. The universal continuous belay system as claimed in claim 6, wherein a width of the interlocking gap is greater than a thickness of the transition no-load portion.

9. The universal continuous belay system as claimed in claim 1 comprises:

the bifurcating plate further comprises a plurality of cable attachment holes and a plurality of barricades;

each of the plurality of cable attachment holes being peripherally positioned on the corresponding leg of the cross-shaped body;

each of the plurality of cable attachment holes traversing through the cross-shaped body, parallel to a central axis of the cross-shaped body;

the plurality of barricades being radially positioned about the central axis in between the plurality of cable attachment holes and the plurality of third studs; and each of the plurality of barricades being integrated through the cross-shaped body.

10. The universal continuous belay system as claimed in claim 1, wherein a width of the interlocking gap is greater than a thickness of the cross-shaped body.

11. The universal continuous belay system as claimed in claim 1 comprises:

a length of the first stud being greater than an interlocking distance between an arbitrary stud and an adjacent stud, wherein the arbitrary stud and the adjacent stud is from the plurality of third studs;

the length of the first stud being equal to a length of the second stud.

12. A universal continuous belay system comprises:

an at least one engagement hook;

an at least one bifurcating plate;

an at least one cable tensioning anchor;

a system of cables;

an at least one T-shaped anchor plate;

a first selected cable from the system of cables;

the engagement hook comprises a C-shaped body, a tether attachment hole, a first stud, and a second stud;

the tether attachment hole traversing through the C-shaped body, parallel to a central hole of the C-shaped body;

the first stud and the second stud being integrated through the C-shaped body, parallel to the central hole;

the first stud being positioned adjacent to an interlocking gap of the C-shaped body;

the second stud being positioned adjacent to the interlocking gap, opposite the first stud;

the bifurcating plate comprises a cross-shaped body and a plurality of third studs;

each of the plurality of third studs being integrated through a corresponding leg of the cross-shaped body;

the cable tensioning anchor and the bifurcating plate being tethered amongst the system of cables;

the engagement hook being slidably engaged to the system of cables;

the T-shaped anchor plate comprises a first arm, a second arm, a first cable securement mechanism, and a first anchor hole;

the first arm being oriented perpendicular to the second arm;

the first arm being adjacently connected to the second arm;

the first anchor hole traversing through the second arm;

the first selected cable being adjacently positioned along the first arm; and the first selected cable being attached to the first arm by the first cable securement mechanism.

13. The universal continuous belay system as claimed in claim 12 comprises:

the engagement hook further comprises a safety line;

the safety line being positioned around a rim of the central hole;

the safety line being radially positioned from the rim; and the safety line traversing into a first surface of the C-shaped body.

14. The universal continuous belay system as claimed in claim 12, wherein a width of the interlocking gap is greater than a thickness of the second arm.

15. The universal continuous belay system as claimed in claim 12 comprises:

the first cable securement mechanism comprises a first elongated anchorage block, a first cable-receiving channel, and a plurality of first fasteners;

the first cable-receiving channel laterally traverses into the first elongated anchorage block;

the first elongated anchorage block being positioned adjacent to the first selected cable, opposite the first arm;

the first selected cable being positioned within the first cable-receiving channel;

the plurality of first fasteners being distributed along the first arm; and the first elongated anchorage block being attached to the first arm by the plurality of first fasteners.

16. The universal continuous belay system as claimed in claim 12 comprises:

a second selected cable from the system of cables;

the cable tensioning anchor comprises a cable engagement portion, a transition no-load portion, a second anchor hole, and a second cable securement mechanism;

the cable engagement portion being adjacently connected to the transition no-load portion;

the second anchor hole traversing through the transition no-load portion, offset from the cable engagement portion; and the second selected cable being attached to the cable engagement portion by the second cable securement mechanism;

the second cable securement mechanism comprises a second elongated anchorage block, a second cable-receiving channel, and a plurality of second fasteners;

the second cable-receiving channel laterally traverses into the second elongated anchorage block;

the second elongated anchorage block being positioned adjacent to the second selected cable, opposite the cable engagement portion;

the second selected cable being positioned within the second cable-receiving channel;

the plurality of second fasteners being distributed along the cable engagement portion; and the second elongated anchorage block being attached to the cable engagement portion by the plurality of second fasteners.

17. The universal continuous belay system as claimed in claim 15, wherein a width of the interlocking gap is greater than a thickness of the transition no-load portion.

18. The universal continuous belay system as claimed in claim 12 comprises:

the bifurcating plate further comprises a plurality of cable attachment holes and a plurality of barricades;

each of the plurality of cable attachment holes being peripherally positioned on the corresponding leg of the cross-shaped body;

each of the plurality of cable attachment holes traversing through the cross-shaped body, parallel to a central axis of the cross-shaped body;

the plurality of barricades being radially positioned about the central axis in between the plurality of cable attachment holes and the plurality of third studs; and each of the plurality of barricades being integrated through the cross-shaped body.

19. The universal continuous belay system as claimed in claim 12, wherein a width of the interlocking gap is greater than a thickness of the cross-shaped body.

20. The universal continuous belay system as claimed in claim 12 comprises:

a length of the first stud being greater than an interlocking distance between an arbitrary stud and an adjacent stud, wherein the arbitrary stud and the adjacent stud is from the plurality of third studs; and the length of the first stud being equal to a length of the second stud.

* * * * *